United States Patent
Tsuchiya

[11] Patent Number: 5,841,896
[45] Date of Patent: *Nov. 24, 1998

[54] METHOD AND APPARATUS FOR DISPLAYING THE HUE OF A SIGNAL BY UTILIZING AN INDICATOR STRIP HAVING A NUMBER OF CHARACTERS OR SYMBOLS REPRESENTING RESPECTIVE HUES

[75] Inventor: Kazuhisa Tsuchiya, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 558,916

[22] Filed: Nov. 13, 1995

[30] Foreign Application Priority Data

Nov. 15, 1994  [JP]  Japan ................................. 6-280948

[51] Int. Cl.⁶ ................................................. G06K 9/00
[52] U.S. Cl. ............................................. 382/162; 345/327
[58] Field of Search ................................. 382/162, 167; 348/453, 30, 649, 645; 358/518, 520; 395/131; 345/150, 327, 328

[56] References Cited

U.S. PATENT DOCUMENTS

| 5,012,299 | 4/1991 | Sawamura et al. | 358/520 |
| 5,282,021 | 1/1994 | Bachmann et al. | 348/649 |
| 5,412,773 | 5/1995 | Carlucci et al. | 395/349 |
| 5,424,754 | 6/1995 | Bar et al. | 395/131 |
| 5,521,615 | 5/1996 | Boyan | 345/150 |
| 5,537,228 | 7/1996 | Dillenger | 358/502 |
| 5,633,953 | 5/1997 | Kouzaki | 382/167 |

*Primary Examiner*—Yon J. Couso
*Attorney, Agent, or Firm*—Frommer Lawrence & Haug, LLP; William S. Frommer; Dennis M. Smid

[57] ABSTRACT

A display apparatus and method for displaying a hue of a color signal so as to be readily understandable to an operator. Such apparatus and method utilizes a display having an indicator strip with a series of characters or letters indicating representative colors. Such indicator strip may also provide an indication of the positional relationships between adjacent colors. By displaying a position on the indicator strip, the display provides a readily identifiable indication of the hue so as to enable an ordinary person or unskilled operator to readily comprehend or grasp the hue.

20 Claims, 11 Drawing Sheets

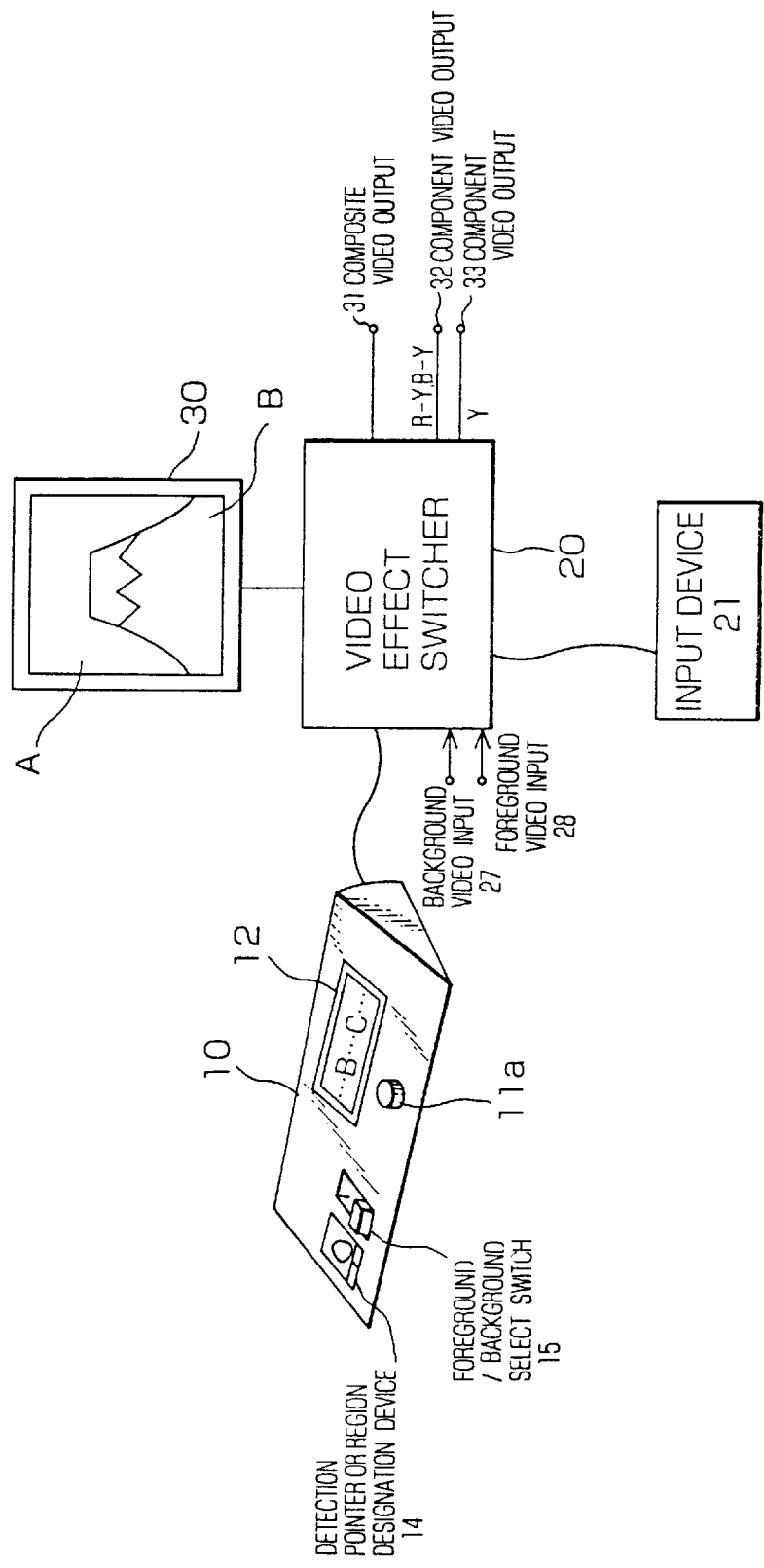

TABLE

| HUE | CHARACTER |
|---|---|
| 349°~12° | • |
| 13°~36° | • |
| 37°~60° | • |
| 61° | M |
| 62°~103° | • |
| 104° | R |
| 105°~125° | • |
| 126°~146° | • |
| 147°~167° | • |
| 168° | Y |
| 169°~192° | • |
| 193°~216° | • |
| 217°~240° | • |
| 241° | G |
| 242°~283° | • |
| 284° | C |
| 285°~305° | • |
| 306°~326° | • |
| 327°~347° | • |
| 348° | B |

METHOD AND APPARATUS FOR DISPLAYING THE HUE OF A SIGNAL BY UTILIZING AN INDICATOR STRIP HAVING A NUMBER OF CHARACTERS OR SYMBOLS REPRESENTING RESPECTIVE HUES

BACKGROUND OF THE INVENTION

The present invention relates to a technique for displaying the hue of a color signal, such as that used in a video apparatus and so forth, so as to be readily understood by an operator.

The hue of a color signal processed by a video apparatus, computer or the like is frequently represented by a vector expression. Such vector expression of a hue may be described with reference to FIG. 9. More specifically, the hue of a color may be expressed as an angle of a coordinate system based on color difference signals B-Y and R-Y. As shown in FIG. 9, representative colors such as blue, magenta, red, yellow, green, and cyan may be respectively depicted as angles 348°, 61°, 104°, 168°, 241°, and 284° of a circle or spectrum. Thus, the hue may be described by providing an angle which corresponds to the appropriate color in accordance with the circle of FIG. 9.

By using a vector scope or similar apparatus, the vector waveform of a color signal in a coordinate system such as that shown in FIG. 9 may be displayed so as to provide an accurate indication of the hue and scale of a color signal. However, during editing operations, special effects operations and so forth which may be performed in a broadcasting station, simpler and lower cost hue detection apparatuses may be utilized. Such apparatuses normally display a detected hue as an angle. For example, when a green color signal is being processed or reviewed by a video apparatus, a value or angle of "241.00°" is displayed as the detected hue.

As is to be appreciated, displaying the hue as a numerical angle may not by itself provide a direct or readily understandable indication of the hue. In other words, it may be difficult to intuitively grasp the respective color by just reading a displayed angle. Further, in the above-described apparatuses, the setting of the axis for the hue may differ between such apparatuses. Accordingly, the use of such apparatuses may cause difficulty in grasping or understanding the hue and, as such, may hinder the performance of the desired operations.

Furthermore, the above-described apparatuses may also be difficult to use when the hue is to be changed. For example, consider the situation in which while reading a displayed angle, it is desired to display a different color. In such situation, it may be difficult to determine the amount in which the angle should be changed and/or the direction in which such change should be made so as to obtain the new color. As another example, consider the situation in which the angle is randomly changed until a desired color is displayed on a display device. In this latter situation, it may be difficult to determine or describe the new color from just the new angle. As a further example, it may be difficult to predict what color would result by a change in the angle.

Therefore, in using the above-described hue displaying apparatuses, it may be difficult for an operator to properly grasp the hue and perform operations thereon unless such operator is an expert knowledgeable in the field regarding the configuration of color signals of televisions, and the like, and the operation of the hue display apparatus. Accordingly, it would be desirable to provide a relatively simple and low cost display apparatus which would provide an indication of the hue of a signal which would be readily understandable to an operator, including one who is not an expert in the field of color signals and hue display apparatuses, and which would enable such operator to more readily perform operations involving changes in the hue.

OBJECTS AND SUMMARY OF THE INVENTION

An object of the present invention is to provide an apparatus and method for displaying a hue of a color signal which provides a direct indication of such hue that is readily understandable by an operator including one who is not an expert in the field of color signals and hue display apparatuses.

Another object of the present invention is to provide a hue display apparatus and method as aforesaid in which the hue may be adjusted or changed with relative ease.

A further object of the present invention is to provide a hue display apparatus and method as aforesaid in which easily recognizable color indications and symbols representing the relative distances between adjacent color indications are utilized to provide an indication of the hue of a color signal so as to enable the operator to perform operations involving the hue and changes thereto with relative ease.

A still further object of the present invention is to provide a hue display apparatus as aforesaid which has a relatively simple construction and which may be fabricated at a relatively low cost.

The present apparatus and method for displaying a hue of a color signal utilizes a display having an indicator strip with a series of letters indicating the representative colors. Such series may also provide an indication of the positional relationships between adjacent colors. By displaying a position within the series of letters, the present display provides a readily identifiable indication of the hue. As is to be appreciated, the present invention enables an ordinary person or unskilled operator to more readily comprehend or grasp the hue as compared to the previously described technique of merely displaying a numerical angle.

In accordance with an aspect of the present invention, a method for displaying a hue of a color signal for use in a video apparatus is provided. The method comprises the steps of determining the hue of the color signal; and displaying the determined hue as a position in an indicating display having a number of arrangements of symbols each including at least one letter which indicates the name of a respective color, in which each letter is arranged based upon a relative positional relationship of the hues of representative colors.

The indicating display utilized in the present hue display method may include symbols arranged between adjacent ones of the letters which respectively vary in accordance with a distance between the representative colors.

In accordance with another aspect of the present invention, a hue display apparatus is provided. Such apparatus comprises an input device for inputting hue information of a color signal for used in a video apparatus; a device for producing information representative of the names of colors corresponding to the inputted hue information; and a display device having a series of symbols each having at least one letter representative of a respective color for displaying a position in the series of symbols which corresponds to the produced information so as to provide an indication of the hue of the color signal.

The present hue display apparatus may further comprise a device for changing the hue information so as to adjust the hue of the color signal, wherein the displayed position in the display device is changed to correspond to the change in the hue so as to provide an indication of the hue change to an operator.

Other objects, features and advantages of the present invention will become apparent from the following detailed description of the illustrated embodiments when read in conjunction with the accompanying drawings in which corresponding components are identified by the same reference numerals.

BRIEF DESCRIPTION OF THE DRAWINGS

FIG. 1 is a diagram of a video system having a hue adjustment apparatus and a video apparatus according to an embodiment of the present invention;

DESCRIPTION OF THE PREFERRED EMBODIMENTS

Figure 2A:
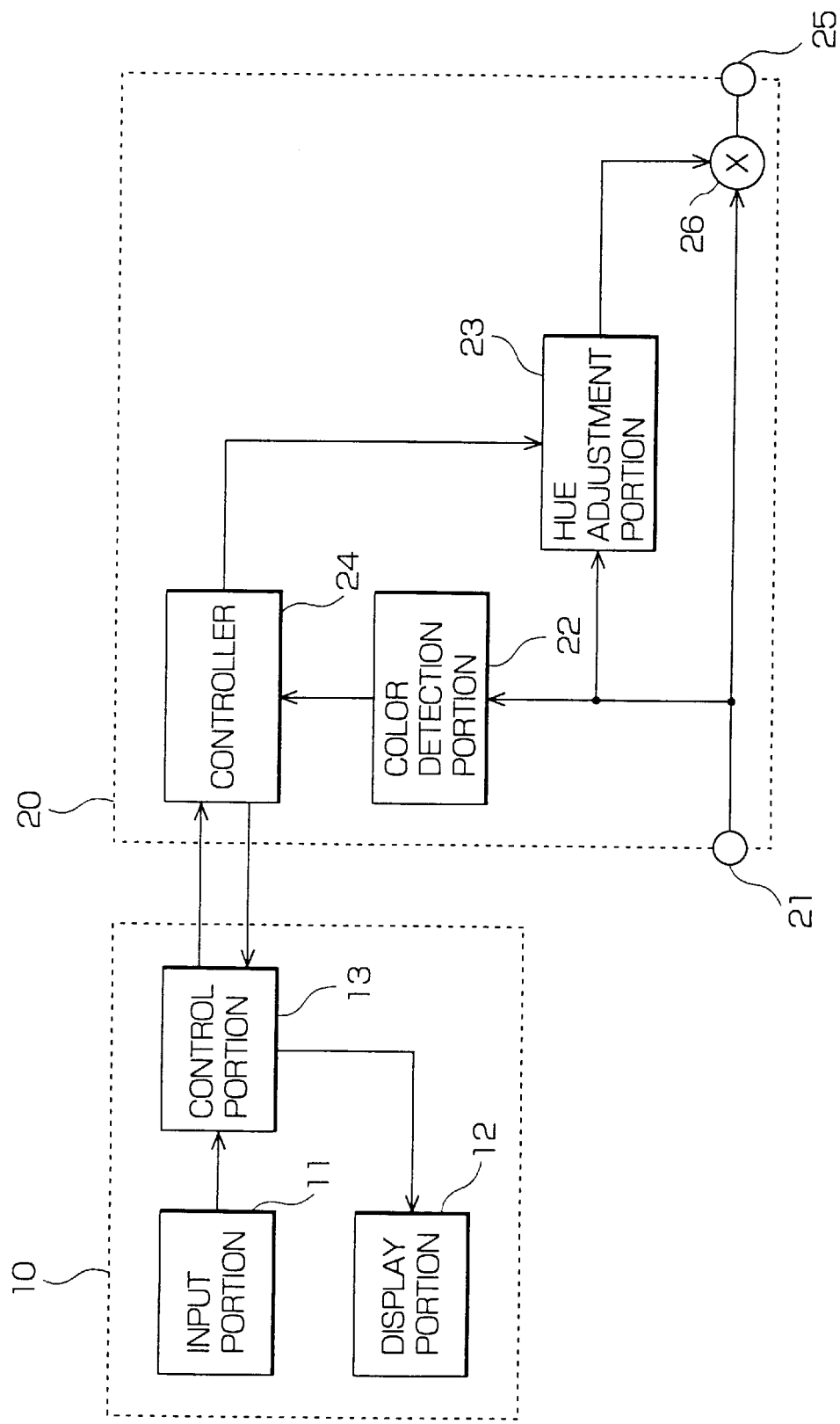
FIG. 2A is a diagram of the hue adjustment apparatus and the video apparatus of FIG. 1.

Preferred embodiments of the present invention will now be explained with reference to the accompanying figures.

FIG. 1 illustrates a video system having a hue adjustment apparatus 10, a video effect switcher or apparatus 20 and a display or monitor 30 which are connected as shown. The display 30 is adapted to receive an output video signal from the video apparatus 20 and to display the same. The video apparatus 20 may respectively receive background and foreground video inputs by way of background and foreground video input terminals 27 and 28, process such input video signals in accordance with inputs received from an operator by way of an input device 21, and supply processed signals to the display 30 and output terminals such as a composite video output terminal 31 and component video output terminals 32 and 33. The processing performed by the video apparatus 20 may include performing video special effects such as fade-in/fade-out and so forth. The operator operates the video apparatus 20 while viewing the display 30.

The hue adjustment apparatus 10 includes a knob 11a and a display unit 12. The hue adjustment apparatus 10 may further include a foreground/background select switch 15 and a detection point or region designation input device 14. The foreground/background select switch 15 enables the operator to select either the background A or foreground B displayed on the monitor 30. The detection point or region designation device 14 enables the operator to select a desired point or region on the selected one of the foreground or background displayed on the monitor 30. Such pointing device 14 may include a joystick, track ball or similar device which is adapted to enable the operator to readily move a cursor on the monitor 30 to a desired location. The display unit 12 is adapted to display a hue of a color signal corresponding to a location on the display 30 such as that designated by the pointing device 14. The knob 11a is adapted to enable the operator to change the hue. The operator may adjust the knob 11a while viewing the color displayed on the display unit 12 so as to change the color of a desired location of the video image displayed on the display 30 (such as the background A) to a desired color.

The hue adjustment apparatus 10 and portions of the video apparatus 20 will now be more fully described with reference to FIG. 2A.

As shown in FIG. 2A, in addition to the display portion 12, the hue adjustment apparatus 10 includes an input unit 11 and a control unit 13. The video apparatus 20 includes an input terminal 21, a color detection unit 22, a hue adjustment unit 23, a controller 24, a combining circuit 26 and an output terminal 25. A further description of the hue adjustment apparatus 10 and the video apparatus 20 will be presented below.

With regard to the video apparatus 20, a video signal is received at the input terminal 21 and separated into a color signal and a luminance signal. The input terminal 21 may include the background and foreground video input terminals 27 and 28, respectively. The color signal is supplied to the color detection unit 22 and the hue adjustment unit 23. The color detection unit 22 is adapted to convert the hue of the color signal to an angular expression with reference to a predetermined hue axis and output a signal indicative of such angular expression to the controller 24. The controller 24 is adapted to receive the output signal indicative of the angular expression from the color detection portion 22 and to supply the same to the hue adjustment apparatus 10. The controller 24 is further adapted to receive an output signal from the hue adjustment apparatus 10 which corresponds to a hue angle adjusted by the hue adjustment apparatus 10 as hereinafter more fully described and to supply such signal to the hue adjustment unit 23. A new color signal is generated by the hue adjustment unit 23 based on the color signal obtained from the original video signal supplied to the input terminal 21 and the adjusted hue angle signal from the controller 24. The newly generated color signal from the hue adjustment unit 23 and the luminance signal of the original video signal are supplied to the combining circuit 26, whereupon a new video signal is formed and supplied to the output terminal 25. The output terminal 25 may include the composite video output terminal 31 and component video output terminals 32 and 33.

Figure 2B:
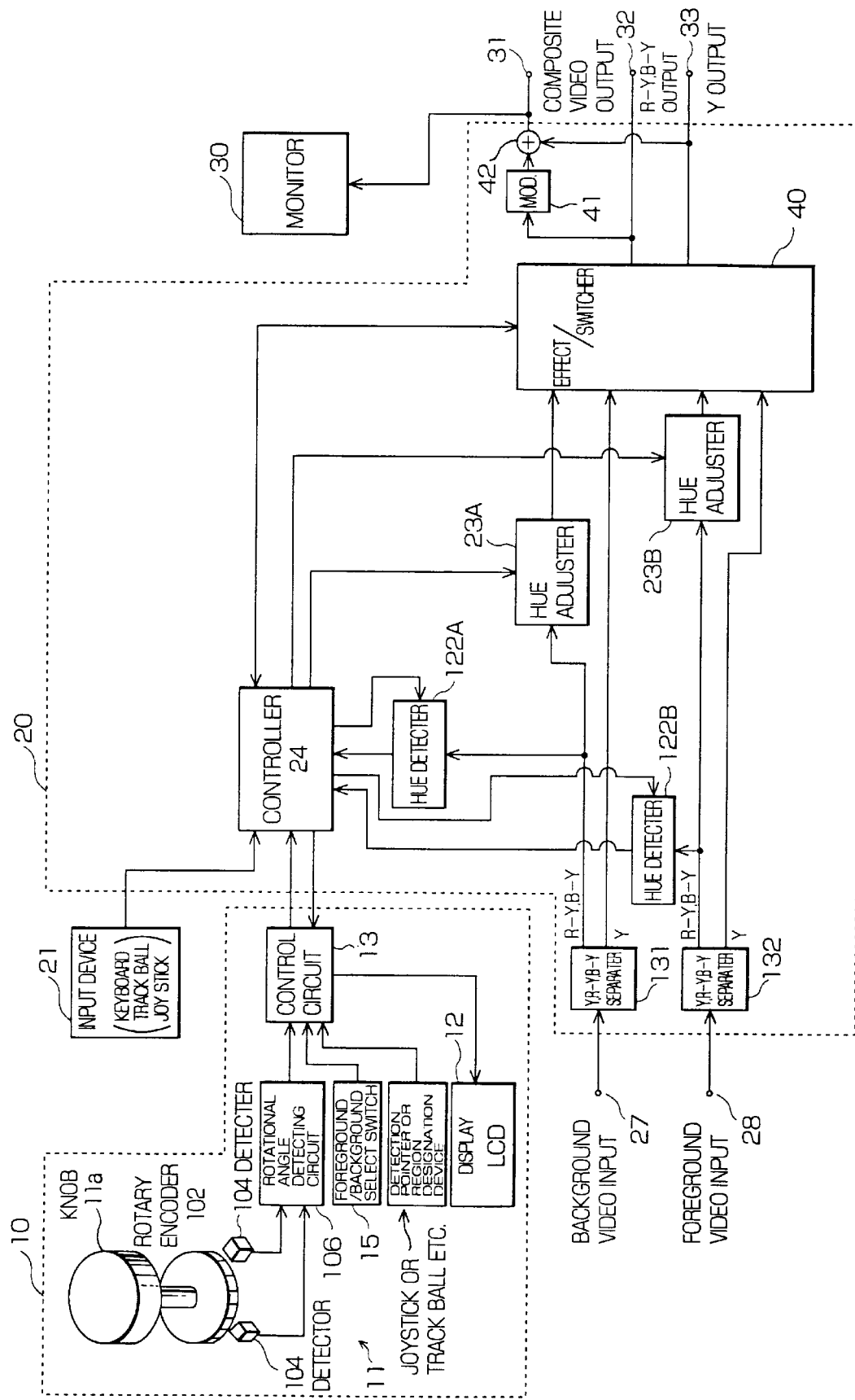
FIG. 2B is a another diagram of the hue adjustment apparatus and the video apparatus of FIG. 1.

With regard to the hue adjustment apparatus 10, the input unit 11 includes the knob 11a and an encoder (such as an encoder 102 of FIG. 2B). The knob 11a may be selectively turned or rotated by an operator so as to cause the hue to be adjusted. The angle of rotation of the knob 11a is detected by the encoder which supplies a signal corresponding thereto to the control unit 13. The control unit 13 converts the signal corresponding to the angle of rotation of the knob 11a to a signal representative of the desired change of the hue and outputs the change signal to the controller 24 of the video apparatus 20. The control unit 13 further receives the hue output signal from the controller 24 of the video apparatus 20 and produces display data corresponding thereto which is supplied to the display unit 12. The control unit 13 may also form display data corresponding to an adjusted hue which may be supplied to the display unit 12. The display unit 12 receives the display data signal from the control unit 13 and displays a character or characters corresponding thereto so as to provide an indication of the respective color or hue. Such display unit 12 may be a relatively simple display such as an LED or liquid crystal display which provides approximately one line of information as hereinafter more fully described.

FIG. 2B illustrates the hue adjustment apparatus 10 and portions of the video apparatus 20 shown in FIG. 2A in more detail. In the interest of brevity, only the differences between the arrangement of FIGS. 2A and 2B and a brief description of the remaining similar portions will be described below.

As shown in FIG. 2B, the hue adjustment apparatus 10 includes the input unit 11, the display portion 12 and the control unit 13, which are coupled together in a manner similar to that in FIG. 2A. As shown in FIG. 2B, the input unit 11 includes the knob 11a, the rotary encoder 102, one or more detectors 104, a rotational angle detecting circuit 106, the foreground/background select switch 15 and the point detecting device 14. The rotary encoder 102 is coupled to the knob 11a so as to rotate in response to a rotation of the knob. The detector(s) 104 are adapted to detect the angular movement of the rotary encoder 102 and to provide signals or pulses indicative of such angular movement to the rotational angle detecting circuit 106. The rotational angle detecting circuit 106 receives the signals from the detector (s) 104 and generates a signal corresponding to the angle or angular movement of the knob 11a which is supplied to the control circuit 13. The foreground/background select switch 15 and the point detecting device 14 are coupled to the control circuit 13 and are adapted to provide respective input signals to the control circuit. In a manner similar to that previously described, the control circuit 13 produces display data from the received hue output signal from the controller 24 of the video apparatus 20 and supplies the same to the display unit 12. The control circuit 13 further receives and processes output signals from the rotational angle detecting circuit 106, the foreground/background select switch 15 and the pointing device 14 and supplies a signal corresponding thereto to the controller 24 of the video apparatus 20. Additionally, the control circuit 13 may form adjusted hue display data from the received hue output signal from the controller 24 and the output signals from the rotational angle detecting circuit 106 and may supply the same to the display unit 12 so as to be displayed thereon.

The video effect switcher 20 generally includes the background and foreground video input terminals 27 and 28, separators 131 and 132, hue detectors 122A and 122B, hue adjusters 23a and 23b, the controller 24, and an effect/switcher circuit 40, which are connected as shown in FIG. 2B. Background and foreground video signals are respectively supplied through the background and foreground video input terminals 27 and 28 to separators 131 and 132, whereupon the input signals are separated into luminance (Y) and color signals such as color difference signals R-Y and B-Y. The color signals from the separators 131 and 132 are respectively supplied to the hue detectors 122A and 122B and the hue adjusters 23A and 23B. The hue detectors 122A and 122B are adapted to detect the hue of the received color signals and to generate output signals corresponding thereto. Such output signals may represent an angular expression or the corresponding hue angles. The output signals from the hue detectors 122A and 122B are supplied to the controller 24 so as to be processed and supplied to the control circuit 13 in a manner similar to that previously described. The hue detectors 122A and 122B may also receive and process output signals from the controller indicative of a cursor location on the monitor 30. Output signals corresponding to an adjusted hue from the control circuit 13 are received by the controller 24 and supplied to the appropriate one or ones of the hue adjusters 23A and 23B. In addition to such adjusted hue signals, the hue adjusters also respectively receive the color signals from the separators 131 and 132, as previously described. Based upon the received signals, the hue adjusters 23A and 23B may generate new color signals. Such newly generated color signals and the luminance signals from the separators 131 and 132 are supplied to the effect/switcher circuit 40. The effect/switcher circuit 40 is adapted to perform special effects (such as fade in/fade out and so forth) and to process the received signals so as to form output signals such as output luminance (Y) and color difference signals (R-Y, B-Y) which are supplied to output terminals 33 and 32, respectively. The controller 24 may be directly coupled to effect/switcher circuit 40 so as to supply signals therebetween.

The luminance output signal from the effect/switcher circuit 40 may also be supplied to an adding circuit 42, and the color difference output signals may also be modulated by a modulating circuit 41 whereupon a modulated color difference signal is supplied to the adding circuit. The adding circuit 42 adds or combines the received signals so as to form a composite video output signal which is supplied to the monitor 30 and the output terminal 31.

As shown in FIG. 2B, the input device 21 is coupled to the controller 24 and is adapted to supply thereto input commands or signals from the operator. Such input device may include a keyboard, track ball, joy stick and so forth.

Figure 3:
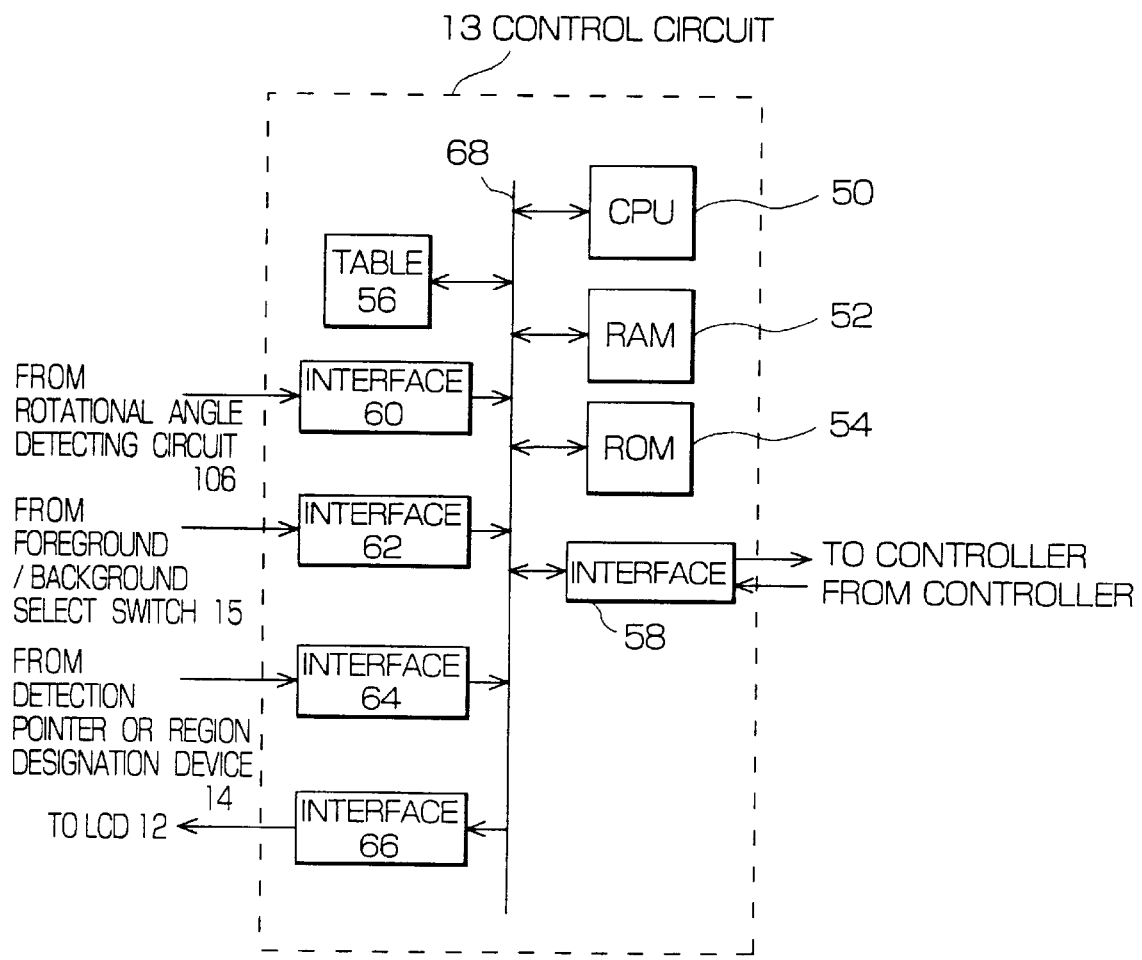
FIG. 3 is a diagram of a control circuit of the hue adjustment apparatus of FIG. 1.
Figures 4, 5:
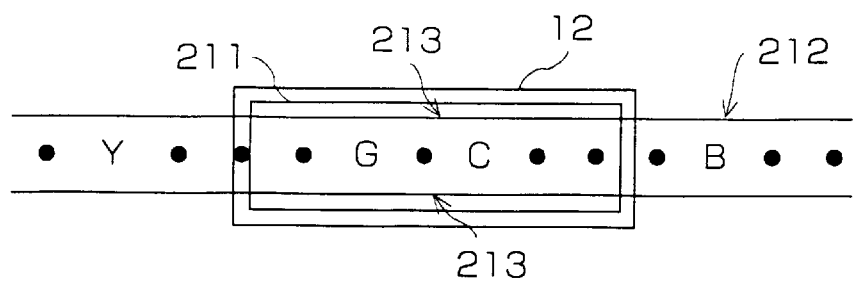
FIG. 4 is a table illustrating characters as a function of hue which may be displayed in the hue adjustment apparatus of FIG. 1.
FIG. 5 is a diagram of a display unit of the hue adjustment apparatus of FIG. 1 including a portion of an indicator strip having a first arrangement or type of characters representing various hues.

FIG. 3 illustrates the control circuit 13 of the hue adjustment apparatus 10. As shown therein, the control circuit 13 may include a processor or CPU 50, a random access memory (RAM) 52, a read only memory (ROM), a table 56, and interfaces 58, 60, 62, 64 and 66 which may be coupled together by way of a line or bus 68. The CPU 50 is adapted to control the processing performed by the control circuit 13. The RAM 52 and ROM 54 may store programs and data which may be utilized during the operation of the control circuit 13. The interface 58 is used for receiving and supplying signals from and to the controller 24. Signals from the rotational angle detecting circuit 106, the foreground/background select switch 15 and the pointing device 14 are respectively received through the interfaces 60, 62 and 64, and signals for the display unit 12 are supplied thereto by way of the interface 66. The table 56 may be adapted to store hue and character data such as that illustrated in FIG. 4 which may be displayed by the display unit 12, as hereinafter more fully described. In particular, FIG. 4 illustrates ranges of angles (or hues) and the corresponding characters or symbols. For example, an angle of 61 degrees may be displayed on the display unit 12 as "M" which represents magenta.

The hue display provided on the display unit 12 of the hue adjustment apparatus 10 will now be more fully described.

As shown in FIG. 5, the display unit 12 includes a strip-like indicator 212 having a plurality of letters and symbols and a window 211 so as to enable the operator to see a portion of such indicator. Such portion of the indicator corresponds to the hue of a color signal. The window 211 of the display unit 12 may be configured so as to have a relatively narrow width which provides a relatively narrow viewing area or display zone. The width of the window 211 may be at least as wide as the width of the letters and symbols on the indicator 212.

Figure 9:
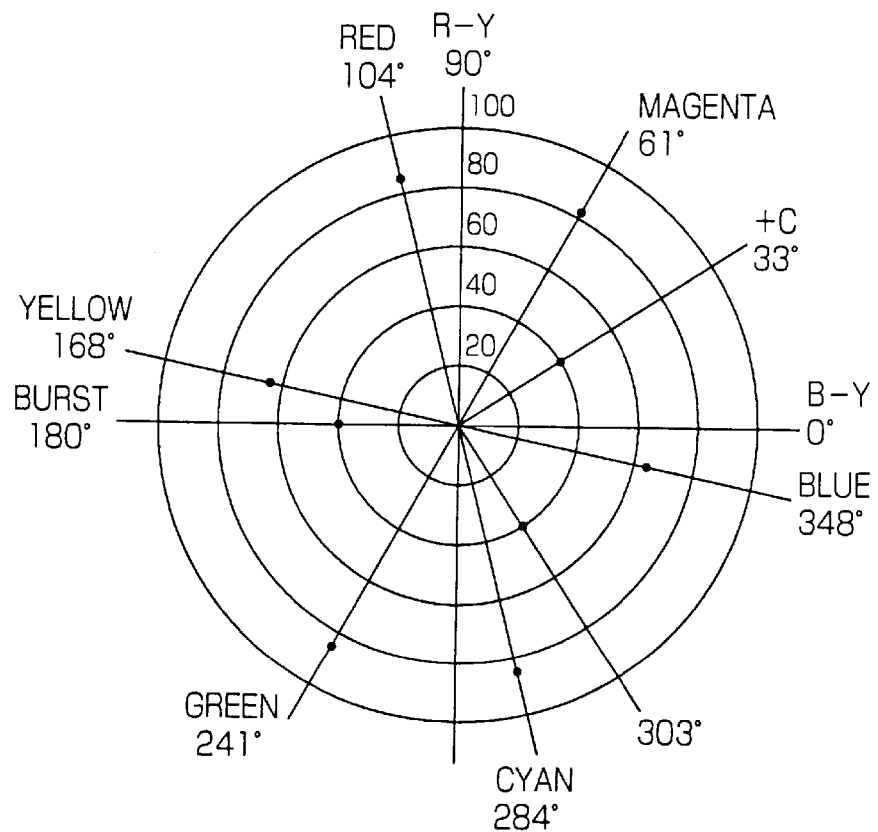
FIG. 9 is a diagram to which reference will be made in explaining a vector expression of the hue.

The strip-like indicator 212 may correspond to the 360° diagram or spectrum of FIG. 9 and/or the table of FIG. 4. Representative colors such as blue, magenta, red, yellow, green, and cyan are respectively represented on the indicator 212 by predetermined letters, such as the first letter of each color. For example, green is represented by "G", red by "R" and so forth. Such letters, which may be capital letters, may be arranged at predetermined positions on the strip 212. In-between such capital letters symbols, such as ".", may be provided at predetermined intervals to facilitate an understanding of the corresponding angular intervals between colors. For example, as shown in FIG. 9, there is an angle of approximately 43 degrees between green (G) and cyan (C), and an angle of approximately 73 degrees between green and yellow (Y). Accordingly, on the strip 212, one "." is provided between green (G) and cyan (C), and three "." (or " . . . ") are provided between green (G) and yellow (Y). Thus, the vector of the hue of the color signal may be displayed on the strip-like indicator 212 in accordance with a vector expression of the hue obtained from FIG. 9.

The window 211 of the display unit 12 is fixed and the strip-like indicator 212 moves in accordance with the display data signal provided from the control circuit 13 (FIG. 2) so as to align the appropriate letter or symbol corresponding to the respective hue in the window of the display unit 12. The appropriate letter or symbol may be aligned in the center of the window of the display unit 12. To facilitate the reading of such letter or symbol by the operator, a line or mark 213 may be provided in the center of the window. When the display data continuously changes, the strip-like indicator 212 moves accordingly.

As a result, the display data produced by the control unit 13 may be displayed on the display unit 12 in a manner which is readily understandable to an operator. For example, in the situation shown in FIG. 5, the detected hue of the color signal is indicated to be between green (G) and cyan (C) and slightly toward cyan (C). In this situation, if the hue axis or axes are as shown in FIG. 9, the hue would lie in a range between approximately 265° and 275°.

Figure 6A:
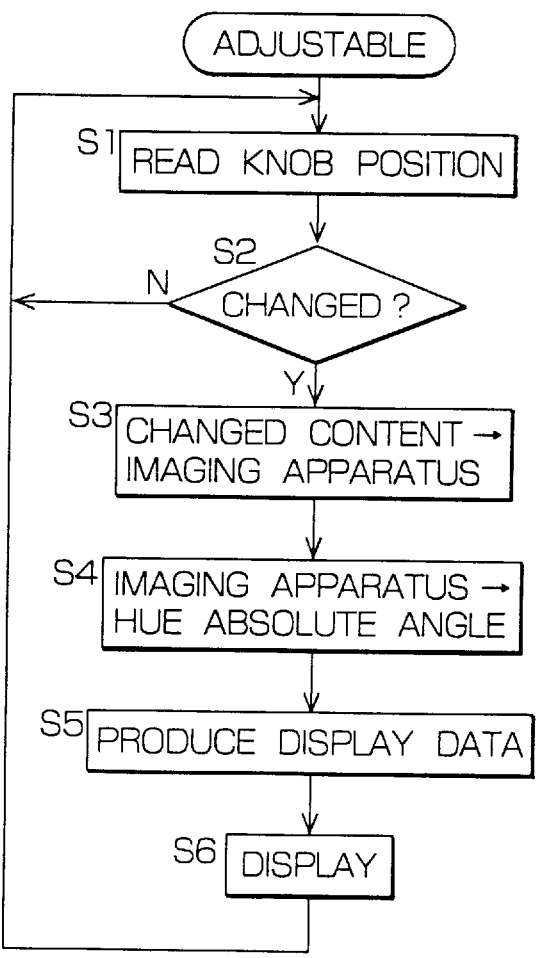
FIGS. 6A, 6B, 6C and 6D are flow charts to which reference will be made in explaining operations pertaining to the hue adjustment apparatus and video apparatus of FIG. 1.

A description regarding the adjusting of the hue as performed by the hue adjustment apparatus 10 and video apparatus 20 will now be provided with reference to the flow chart of FIG. 6A.

Upon applying power so as to enable the adjustment operation or mode to be initiated, the position of the knob 11a is read at step S1. Processing continues to step S2, whereupon it is determined whether or not a change in the position of the knob 11a has occurred. If there is no change in the position of the knob 11a, processing returns to step S1 so that the position of the knob 11a is again checked. However, if there is a change in the position of the knob 11a, processing proceeds to step S3 whereupon the amount of change of the angle of the hue is determined and supplied to the video apparatus 20. As a result, the hue of a predetermined position is changed by the video apparatus 20 in accordance with the amount of hue change from the hue adjustment apparatus 10. Processing then continues to step S4, wherein the obtained changed hue signal is supplied from the video apparatus 20 to the hue adjustment apparatus 10. Based upon such received signal, the control unit 13 of the hue adjustment apparatus 10 produces the display data or information as indicated in step S5. The display data is supplied to the display unit 12 so as to be displayed thereon as indicated in step S6. The processing from step S1 to step S6 may be successively repeated so as to enable desired adjustment of the hue to be performed.

Figure 6B:
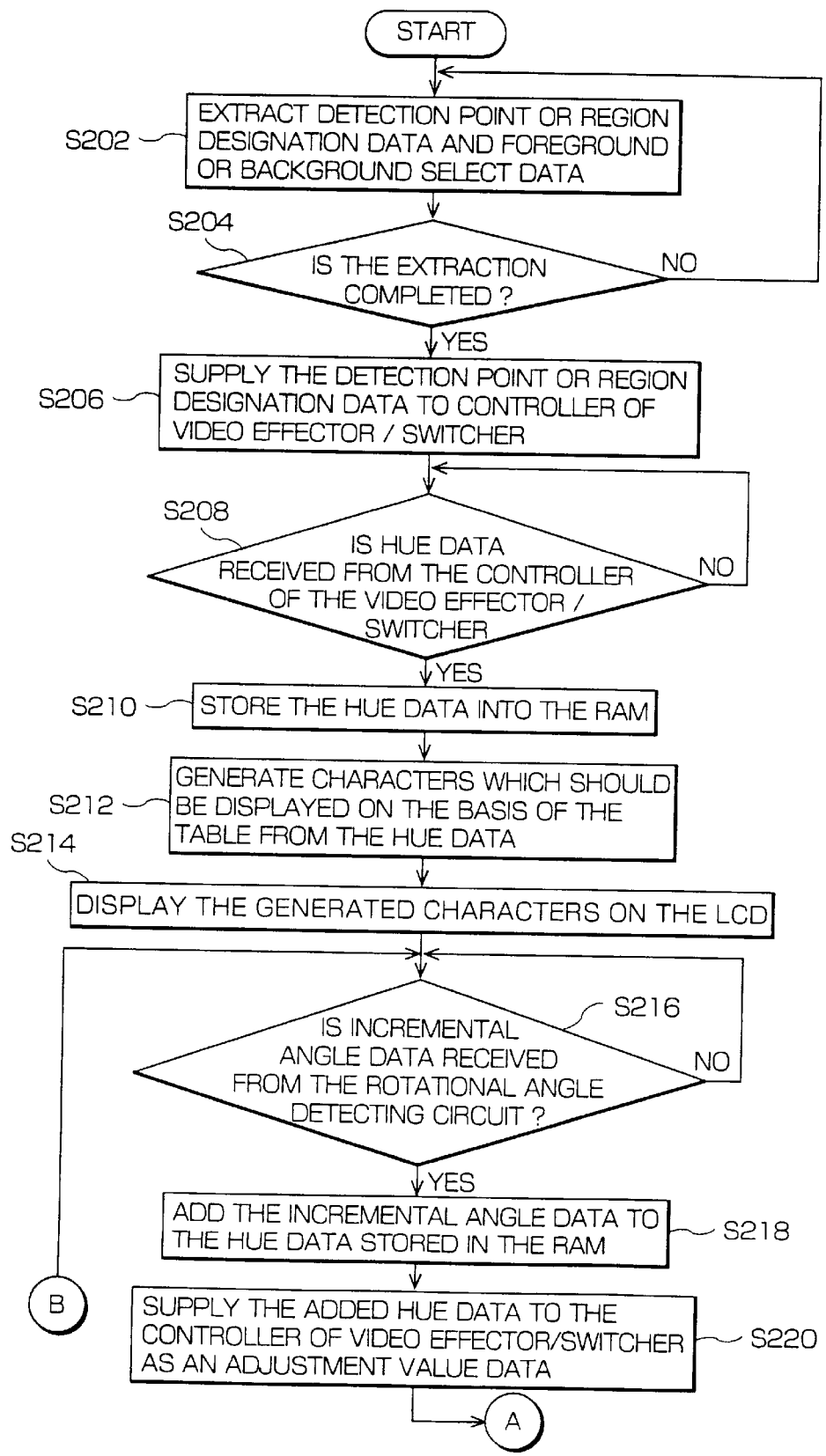
Figure 6C:
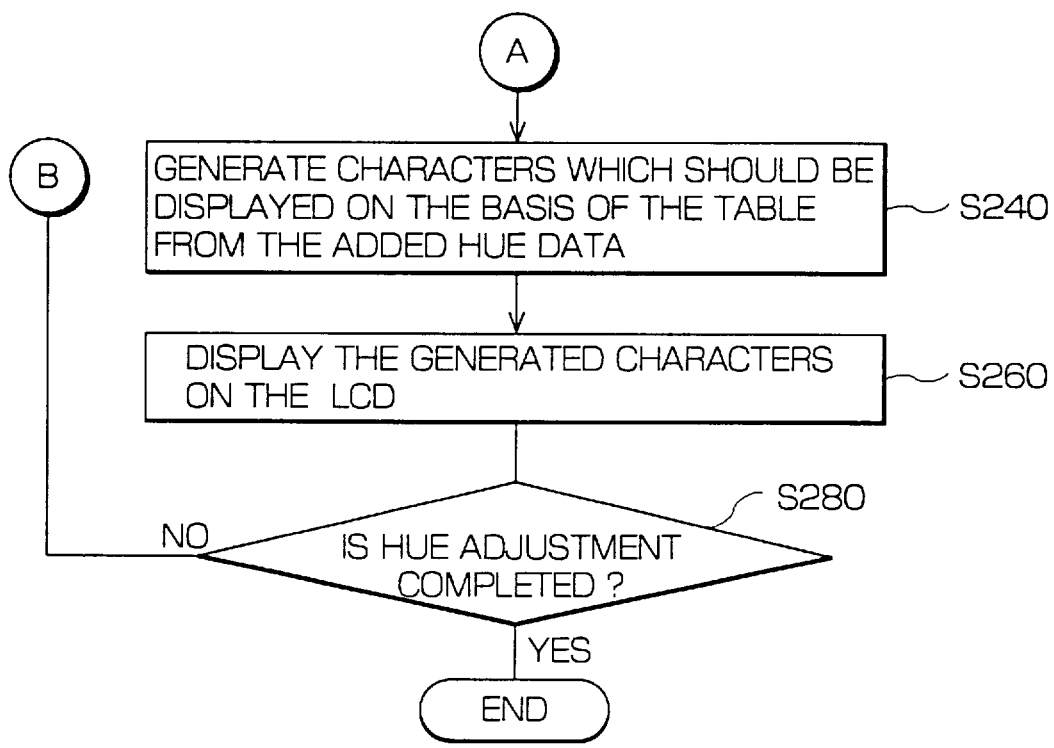

The operation of the control circuit 13 of the hue adjustment apparatus 10 will now be described with reference to the flow chart of FIGS. 6B and C.

Data pertaining to a desired point or region designated by use of the pointing device 14 and pertaining to the selected foreground or background obtained from the foreground/background select switch 15 are extracted or obtained in step S202. In step S204, a determination is made as to whether such extraction is completed. If the extraction is not completed, processing returns to step S202. If, however, the extraction is completed, processing proceeds to step S206, whereupon the detected or desired location data is supplied to the controller 24 of the video effect/switcher 20. Thereafter, processing proceeds to step S208, whereupon a determination is made as to whether hue data has been received from the controller 24. If NO, such determination is again made. If, however, such determination is affirmative, processing proceeds to step S210, whereupon the hue data is stored in the RAM 52 of the control circuit 13. Thereafter, processing continues to step S212, wherein characters are generated from the hue data by use of the table 56. Processing then proceeds to step S214, whereupon the characters are displayed on the LCD 12. Thereafter, a determination is made in step S216 as to whether adjusted or incremental angle data has been received from the rotational angle detecting circuit 106. If no, such determination is again made. If, however, such determination is affirmative, processing proceeds to step S218 wherein the incremental angle data is added to the hue data stored in the RAM 52 by, for example, the CPU 50 of the control circuit 13. Thereafter, processing proceeds to step S220, whereupon the summed or added hue data is supplied to the controller 24. Processing then proceeds to step S240, wherein characters are generated from the added hue data by use of the table 56. Such characters are displayed on the display 12 in step S260. Thereafter, a determination is made in step S280 as to whether the hue adjustment operation is completed. If such determination is negative, processing returns to step S216.

Figure 6D:
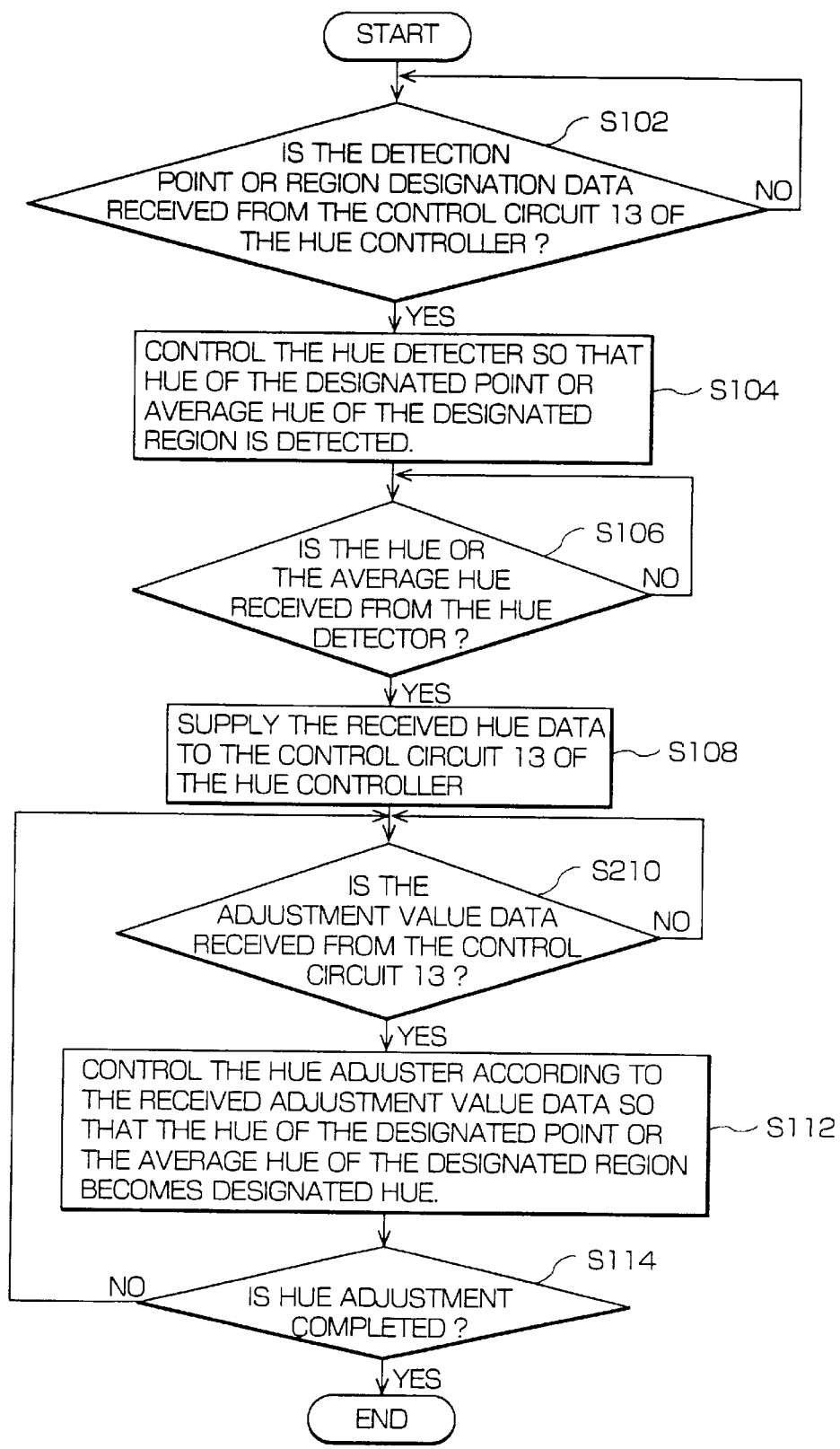

The operation of the controller 24 of the video effect/switcher 20 will now be described with reference to the flow chart of FIG. 6D.

At step S102, a determination is made as to whether the desired or detection location data has been received from the control circuit 13 of the hue adjustment apparatus 10. If NO, such determination is again made. However, if such determination is affirmative, processing proceeds to step S104, whereupon the appropriate one or ones of the hue detectors is controlled so that the hue of the designated point (or, if a region has been designated, an average hue) is detected. Such hue is determined for a point by sensing the hue of a pixel corresponding thereto or, if a region is selected, by averaging the hues of the pixels within the region. Thereafter, a determination is made in step S106 as to whether the hue or average hue has been received from the hue detector(s). If not, such determination is again made. However, if such determination is affirmative, processing proceeds to step S108, whereupon the received hue data is supplied to the control circuit 13. Thereafter, processing proceeds to step S110, wherein a determination is made as to whether adjustment data has been received from the control circuit 13. If not, such determination is made again. However, if such determination is affirmative, processing proceeds to step S112, whereupon the hue adjuster(s) are controlled so as to obtain the hue for such designated point or region. Thereafter, processing proceeds to step S114, wherein a determination is made as to whether the hue adjustment operation is completed. If such determination is negative, processing returns to step S110.

A description of the relation between the display of the hue and the operation of the knob 11a in the hue adjustment apparatus 10 will now be provided.

Figure 7A:
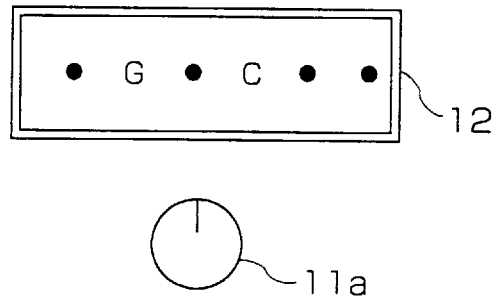
FIGS. 7A, 7B and 7C are diagrams of various positions of the display unit and a knob of the hue adjustment apparatus of FIG. 1.
Figure 7B:
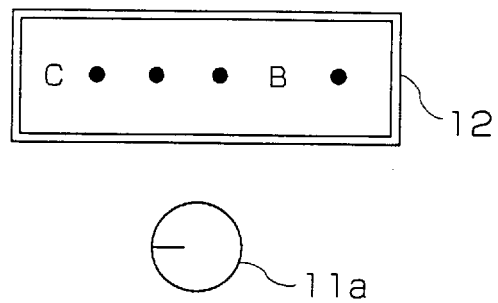
Figure 7C:
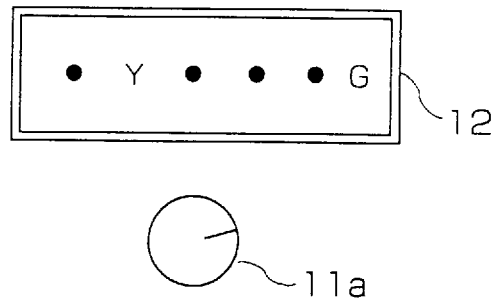

FIGS. 7A–C illustrate examples of the relationship between the knob 11a of the input unit 11 and the display unit 12. More specifically, FIG. 7A illustrates the knob 11a and a respective hue displayed by the display unit 12. FIG. 7B illustrates the hue displayed by the display unit 12 when the knob 11a is turned to the left, and FIG. 7C illustrates the hue displayed by the display unit 12 when the knob 11a is turned to the right.

As shown in FIGS. 7A–C, the operation of the knob 11a may be arranged so that the direction of hue change on the display unit 12 coincides with turning direction of the knob. As a result, as shown in FIG. 7B, by turning the knob 11a to the left or counter-clockwise from the position of FIG. 7A, the hue may be adjusted in a left or clockwise direction of the coordinate system shown in FIG. 9. In this situation, the letters and symbols shown on the display 12 appear to move in the left direction when the display is properly viewed by the operator. Further, as shown in FIG. 7(C), by turning the knob to the right or clockwise, the hue may be adjusted in a right or counter-clockwise direction of the coordinate system shown in FIG. 9. In this situation, the letters and symbols shown on the display 12 appear to move in the right direction.

Thus, in the hue adjustment apparatus 10, the operation of the knob 11a may coincide with the direction of hue change on the display unit 12. Such arrangement enables the hue to be intuitively and relatively easily adjusted by the operator.

Therefore, the present invention provides an indication of the hue of a video signal by displaying a corresponding position of an indicator strip which includes letters indicating the names of the representative colors. Such indication of the hue may be readily grasped or understood by an operator including one who is not an expert in the field of color signals and hue display apparatuses. As a result, the operator may be able to more efficiently and easily perform operations involving the hue including adjustments to the hue. Further, each letter on the indicator strip is respectively spaced apart from adjacent letters by an amount or distance which corresponds to the angular distance between such colors as defined by a predetermined spectrum such as that of FIG. 9. Such relative spacing may assist the operator in operations involving hue adjustments or in predicting new values of hues. To further emphasis such spacing, symbols may be inserted between the letters.

As is to be appreciated, such present display apparatus has a relatively simple configuration and, as such, has a relatively low fabrication cost.

The present invention is not limited to the above-described embodiment. Instead, various modifications thereof can be provided.

Figure 8:
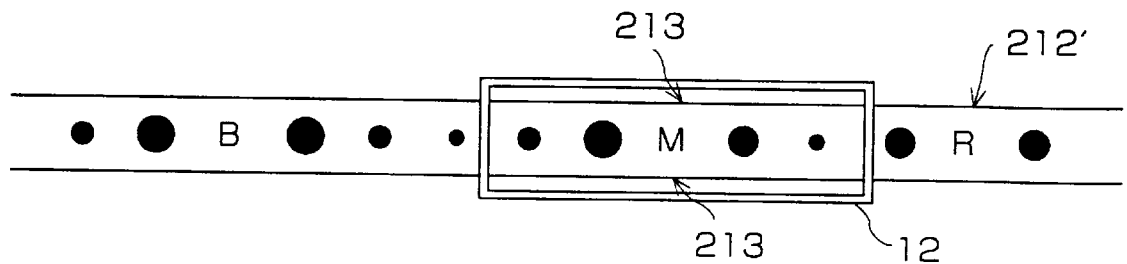
FIG. 8 is a diagram of the display unit of the hue adjustment apparatus of FIG. 1 including a portion of the indicator strip having a second arrangement or type of characters representing various hues.

For example, although the symbols "." having the same size were utilized in describing the symbols which may be included on the indicator strip 212, the present invention is not so limited. That is, various other symbols may be utilized, such as "–" or ">" and so forth. Further, different types or sizes of symbols may be utilized, such as those shown on a strip-like indicator 212' in FIG. 8. As shown therein, this arrangement provides black dots of varying sizes between the capital letters of the representative colors in which the smallest dots are located in the middle between adjacent capital letters and dots of gradually increasing size are positioned from the middle towards the respective color. In such arrangement, the dots increase in size as they get closer to a representative color. Accordingly, such arrangement enables an operator to more easily determine the hue of a color signal.

As another example, the hue adjustment apparatus 10 may be modified. For example, in the above-described embodiment, the value of the hue angle is supplied to the hue adjustment apparatus 10 from the video apparatus 20 and therein converted to display information. However, the hue adjustment apparatus 10 may instead be configured so as to receive the color signal and process such signal so as to obtain the display information. In this configuration, the processing may convert a color signal directly to display information.

As a still further example, the operation of the present invention is not limited to the flow charts of FIG. 6. For example, the operation for displaying the input hue angle and the operation of detecting the angle of rotation of the knob 11a and outputting a signal indicative of the same to the video apparatus 20 may be performed in parallel. Any such operation may be performed by the control unit 13.

As another example, more than one letter or other letters may be used to represent the colors on the strip indicators. For example, all of the letters in each color may be used. Alternatively, a predetermined number of letters may be used, such as the first three letters of each color (e.g., "MAG" for magenta, "BLU" for blue and so forth). Additionally, in place of letters, other symbols or marks may be used to represent the colors. For example, a mark of the actual color may be used.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. Apparatus for displaying hue of a video signal, said apparatus comprising:

detecting means for detecting the hue of the video signal;

means for generating a control data signal corresponding to the hue of the video signal detected by the detecting means; and a display device having only a single movable indicator strip with a plurality of characters each representing a respective hue and having only a single display window, said display device being operative to move said single indicator strip in accordance with said control data signal so as to align the character corresponding to the detected hue of the video signal in said display window so as to provide an identifiable indication of said detected hue for view by an operator.

2. Apparatus according to claim 1, wherein the control data signal generated by the generating means represents a number of characters corresponding to a predetermined angle.

3. Apparatus according to claim 1, wherein the display window has a narrow display zone.

4. Apparatus for displaying hue of a video signal, said apparatus comprising:

detecting means for detecting the hue of the video signal;

means for supplying incremental hue data;

means for adding the detected hue data and the incremental hue data;

means for generating a control data signal corresponding to the added hue data obtained from the adding means; and a display device having only a single movable indicator strip with a plurality of characters each representing a respective hue and having only a single display window, said display device being operative to move said single indicator strip in accordance with said control data signal so as to align the character corresponding to the added hue data obtained from the adding means in said display window so as to provide an identifiable indication of said detected hue for view by an operator.

5. Apparatus according to claim 4, wherein the control data signal generated by the generating means represents a first character or characters corresponding to a predetermined angle.

6. Apparatus according to claim 4, wherein the display window has a narrow display zone.

7. Apparatus according to claim 5, wherein the generating means generates a second character or characters in response to a change of the added hue data from the adding means, and wherein the display device scrolls from the first character or characters to the second character or characters.

8. Apparatus according to claim 4, further comprising adjusting means for adjusting the hue of the video signal in accordance with the added hue data from the adding means.

9. A method for displaying a hue of a color signal for use in a video apparatus, said method comprising the steps of:

determining the hue of the color signal;

generating a control data signal corresponding to the determined hue of the color signal; and moving only a single indicator strip in accordance with said control data signal, said indicator strip having a plurality of arrangements of characters each including at least one letter which indicates the name of a respective color and each said letter being arranged based upon a relative positional relationship of the hues of representative colors, said single indicator strip being moved so as to align the character corresponding to the determined hue of the color signal in a display window so as to provide an identifiable indication of said determined hue for view by an operator.

10. A method according to claim 9, wherein said single indicator strip includes symbols arranged between adjacent ones of said letters which respectively vary in accordance with a distance between the representative colors.

11. A hue display apparatus comprising:

input means for inputting hue information of a color signal for used in a video apparatus;

means for producing information representative of names of colors corresponding to the inputted hue information; and a display device including only a single movable indicator strip having a plurality of series of symbols each having at least one letter representative of a respective color and only a single display window, said display device being operative to move said single indicator strip so as to align the symbol corresponding to the produced information in said display window so as to provide an identifiable indication of the hue of said color signal.

12. A hue display apparatus according to claim 11, further comprising means for changing the hue information so as to adjust the hue of said color signal, the single indicator strip being moved to correspond to the change in said hue so as to provide an identifiable indication of the hue change to an operator.

13. An apparatus for providing an indication of a hue of a color signal, said apparatus comprising:

means for receiving said color signal and for generating information pertaining to the hue of said color signal; and display means, including only a single movable indicator strip having a plurality of groups in which each group has at least one letter representative of a respective color and is spaced apart from adjacent groups by respective predetermined distances corresponding to angular distances between the colors and including only a single display window, said display device being operative to move said single indicator strip so as to display a position in the plurality of groups in said display window which corresponds to the generated hue information so as to provide an identifiable indication of the hue of said color signal.

14. An apparatus according to claim 13, further comprising means for changing the hue of said color signal.

15. An apparatus according to claim 14, wherein said single indicator strip includes symbols between each of said groups.

16. An apparatus according to claim 15, wherein said symbols vary in size in accordance with respective distances between said symbols and the adjacent groups.

17. A method for providing an indication of a hue of a color signal, said method comprising the steps:

receiving said color signal and generating information pertaining to the hue of said color signal; and displaying a position in only a single movable indicator strip which corresponds to the generated hue information in a single window display so as to provide an identifiable indication of the hue of said color signal, in which said single indicator strip includes a plurality of groups in which each group has at least one letter representative of a respective color and is spaced apart from adjacent groups by respective predetermined distances corresponding to angular distances between the colors.

18. A method according to claim 17, further comprising the step of selectively changing the hue of said color signal.

19. A method according to claim 18, wherein said single indicator strip further includes symbols between each of said groups.

20. A method according to claim 19, wherein said symbols vary in size in accordance with respective distances between said symbols and the adjacent groups.

* * * * *